(12) United States Patent
Gupta et al.

(10) Patent No.: US 9,832,682 B2
(45) Date of Patent: Nov. 28, 2017

(54) DISTRIBUTED POLICY ARCHITECTURE

(71) Applicant: Intel Corporation, Santa Clara, CA (US)

(72) Inventors: Vivek G. Gupta, San Jose, CA (US); Necati Canpolat, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/528,153

(22) Filed: Oct. 30, 2014

(65) Prior Publication Data

US 2015/0050942 A1 Feb. 19, 2015

Related U.S. Application Data

(63) Continuation of application No. 13/728,782, filed on Dec. 27, 2012.

(51) Int. Cl.
*H04W 28/08* (2009.01)
*H04W 48/18* (2009.01)
*H04W 72/04* (2009.01)

(52) U.S. Cl.
CPC .......... *H04W 28/08* (2013.01); *H04W 48/18* (2013.01); *H04W 72/0486* (2013.01)

(58) Field of Classification Search
CPC .................................................. H04W 28/08
(Continued)

(56) References Cited

U.S. PATENT DOCUMENTS 7,039,032 B1   5/2006  Ho et al.
7,933,247 B2 * 4/2011  Gidwani ............... H04W 84/00
                                                     370/328
(Continued)

FOREIGN PATENT DOCUMENTS

CN   104798406 A   7/2015
KR   101712045 B1  3/2017
(Continued)

OTHER PUBLICATIONS

"Access Network Discovery and Selection Function (ANDSF) Management Object (MO)", ETSI TS 124 312 V11.4.0 (3GPP TS 24.312 version 11.4.0 Release 11). Universal Mobile Telecommunications System (UMTS). LTE., (Oct. 2012), 170 pgs.
(Continued)

*Primary Examiner* — Daniel Lai
*Assistant Examiner* — Frank Donado
(74) *Attorney, Agent, or Firm* — Schwegman Lundberg & Woessner, P.A.

(57) ABSTRACT

A mobile device may select between multiple networks in order to offload network traffic from one network to another. Policies under which network selection happens are established by network operators. A hierarchy of policy servers are established where a central policy server with policies established by a network operator can delegate authority for network switching to a local policy server with policies established by the same or a different network operator. The central policy server can establish criteria under which network switching or network selection is delegated to a local server. Policies from the local policy server can include information about local network conditions. A mobile device can use the policies from the central server and local server to select a network.

18 Claims, 6 Drawing Sheets

| Parameter | Value |
|---|---|
| Offload Networks | Partner_A; Partner_B; Blue_Network |
| Delegation Policy | Enabled to local server when preferred SSIDs are available |
| Server Access | SOAP-XML; OMA-DM |
| Management Protocol | 802.11v |
| Offload Criteria | WiFi load < 60% |
| Selection Delay Time | 30 min. |
| Validity | Mon-Fri, 6-9 AM and 3-7 PM local time |
| Location | Downtown San Francisco |

(58) Field of Classification Search
USPC .......................................................... 455/453
See application file for complete search history.

(56) References Cited

U.S. PATENT DOCUMENTS

| | | | |
|---|---|---|---|
| 8,145,784 B2 | 3/2012 | See et al. | |
| 8,565,766 B2* | 10/2013 | Scherzer | H04W 48/18 |
| | | | 455/432.3 |
| 8,649,359 B2* | 2/2014 | Doppler | H04W 76/02 |
| | | | 370/338 |
| 2004/0214576 A1* | 10/2004 | Myers | H04L 63/0272 |
| | | | 455/445 |
| 2005/0054300 A1* | 3/2005 | Vogel | H04L 41/22 |
| | | | 455/67.11 |
| 2007/0064660 A1 | 3/2007 | Qi et al. | |
| 2007/0110004 A1* | 5/2007 | Liu | H04W 72/0486 |
| | | | 370/335 |
| 2007/0160079 A1 | 7/2007 | Han et al. | |
| 2011/0044253 A1 | 2/2011 | Zisimopoulos | |
| 2011/0131338 A1 | 6/2011 | Hu | |
| 2011/0188376 A1 | 8/2011 | Stupar et al. | |
| 2012/0076118 A1 | 3/2012 | Montemurro et al. | |
| 2012/0196644 A1* | 8/2012 | Scherzer | H04W 72/02 |
| | | | 455/524 |
| 2012/0309447 A1 | 12/2012 | Mustajarvi et al. | |
| 2012/0324091 A9 | 12/2012 | Raleigh et al. | |
| 2013/0122910 A1 | 5/2013 | Singh et al. | |
| 2013/0230011 A1 | 9/2013 | Rinne et al. | |
| 2013/0254833 A1* | 9/2013 | Nicodemus | G06F 21/55 |
| | | | 726/1 |
| 2014/0099945 A1* | 4/2014 | Singh | H04W 48/18 |
| | | | 455/432.1 |
| 2014/0187252 A1 | 7/2014 | Gupta et al. | |
| 2014/0247807 A1* | 9/2014 | Westerberg | H04W 36/34 |
| | | | 370/331 |
| 2015/0282058 A1 | 10/2015 | Forssell | |

FOREIGN PATENT DOCUMENTS

| | | |
|---|---|---|
| WO | WO-03088599 A1 | 10/2003 |
| WO | WO-2014055789 A2 | 4/2014 |

OTHER PUBLICATIONS

"Access to the 3GPP Evolved Packet Core (EPC) via non-3GPP access networks; Stage 3", ETSI TS 124 302 V11.4.0 (3GPP TS 24.302 version 11.4.0 Release 11). Universal Mobile Telecommunications System (UMTS). LTE., (Oct. 2012), 64 pgs.
"U.S. Appl. No. 13/728,782, Non Final Office Action dated Sep. 29, 2014", 17 pgs.
"Hotspot 2.0 (Release 1) Technical Specification: Version 1.0.0", Wi-Fi Alliance Technical Committee Hotspot 2.0 Technical Task Group, (2012), 25 pgs.
"International Application Serial No. PCT/US2013/044246, International Search Report dated Dec. 30, 2013", 5 pgs.
"International Application Serial No. PCT/US2013/044246, Written Opinion dated Dec. 30, 2013", 6 pgs.
"Part 11: Wireless LAN Medium Access Control (MAC) and Physical Layer (PHY) Specifications: Amendment 9: Interworking with External Networks", Std 802.11u-2011. Local and Metropolitan Area Networks. IEEE Standards Association. IEEE Computer Society., (Feb. 25, 2011), 208 pgs.
"U.S. Appl. No. 13/728,782, Final Office Action dated May 18, 2015", 21 pgs.
"U.S. Appl. No. 13/728,782, Response dated Jan. 27, 2015 to Non Final Office Action dated Sep. 29, 2014", 12 pgs.
"International Application Serial No. PCT/US2013/044246, International Preliminary Report on Patentability dated Jul. 9, 2015", 8 pgs.
"3rd Generation Partnership Project; Technical Specification Group Core Network and Terminals; Access Network Discovery and Selection Function (ANDSF) Management Object (MO) (Release 11)", 3gpp Standard; 3gpp Ts 24.312, 3rd Generation Partnership Project (3GPP), Mobile Competence Centre ; 650, Route Des Lucioles ; F-06921 Sophia-Antipolis Cedex ; France vol. CT WG1, No. VII.5.0,, (Dec. 19, 2012), 1-173.
"U.S. Appl. No. 13/728,782, Advisory Action dated Aug. 27, 2015", 3 pgs.
"U.S. Appl. No. 13/728,782, Examiner Interview Summary dated Jan. 22, 2016", 4 pgs.
"U.S. Appl. No. 13/728,782, Examiner Interview Summary dated Aug. 21, 2015", 3 pgs.
"U.S. Appl. No. 13/728,782, Final Office Action dated Jun. 14, 2016", 27 pgs.
"U.S. Appl. No. 13/728,782, Non Final Office Action dated Oct. 8, 2015", 23 pgs.
"U.S. Appl. No. 13/728,782, Response dated Mar. 7, 2016 to Non Final Office Action dated Oct. 8, 2015", 10 pgs.
"U.S. Appl. No. 13/728,782, Response dated Aug. 17, 2015 to Final Office Action dated May 18, 2015", 11 pgs.
"European Application Serial No. 13867579.8, Extended European Search Report dated Jul. 7, 2016", 12 pgs.
"Korean Application Serial No. 2015-7013824, Office Action dated Apr. 25, 2016", w/ English Translation, 11 pgs.
"Korean Application Serial No. 2015-7013824, Response dated Jul. 5, 2016 to Office Action dated Apr. 25, 2016", W/ English Translation of Claims, 22 pgs.
Alcatel, Lucent, "Wi-Fi Roaming—Building on ANDSF and Hotspot2.0", [Online]. Retrieved from the Internet: URL:http://www.alcatel-lucent.com, (Feb. 27, 2012), 1-45.
"European Application Serial No. 13867579.8, Response dated Jan. 24, 2017 to Extended European Search Report dated Jul. 7, 2016", 12 pgs.
"Korean Application Serial No. 2017-7005266, Office Action dated Mar. 27, 2017", w/ English Translation, 7 pgs.

\* cited by examiner

| Parameter | Value |
|---|---|
| Offload Networks | Partner_A; Partner_B; Blue_Network |
| Delegation Policy | Enabled to local server when preferred SSIDs are available |
| Server Access | SOAP-XML; OMA-DM |
| Management Protocol | 802.11v |
| Offload Criteria | WiFi load < 60% |
| Selection Delay Time | 30 min. |
| Validity | Mon-Fri, 6-9 AM and 3-7 PM local time |
| Location | Downtown San Francisco |

(12) United States Patent
US 9,832,682 B2

DISTRIBUTED POLICY ARCHITECTURE

PRIORITY CLAIM

This application is a continuation of and claims the benefit of priority to U.S. patent application Ser. No. 13/728,782, filed on Dec. 27, 2012, which is hereby incorporated by reference herein in its entirety.

TECHNICAL FIELD

Embodiments pertain to wireless communications. More particularly, embodiments pertain to a distributed policy architecture to offload cellular network traffic to other wireless networks.

BACKGROUND

With the growth of cellular network traffic, there has been increased interest in offloading the cellular network traffic to other wireless networks, such as Wi-Fi networks. However, current efforts to date are unable to take into consideration locally changing conditions and different deployment architectures such as small cells (e.g femto cell, micro cell, pico cell) versus a more traditional macro cellular network layout with overlaid Wi-Fi network.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Various modifications to the embodiments will be readily apparent to those skilled in the art, and the generic principles defined herein may be applied to other embodiments and applications without departing from the scope of the inventive subject matter. Moreover, in the following description, numerous details are set forth for the purpose of explanation. However, one of ordinary skill in the art will realize that embodiments of the invention may be practiced without the use of these specific details. In other instances, well-known structures and processes are not shown in block diagram form in order not to obscure the description of the embodiments of the invention with unnecessary detail. Thus, the present disclosure is not intended to be limited to the embodiments shown, but is to be accorded the widest scope consistent with the principles and features disclosed herein.

With the growth of wireless networks of all kinds, there are situations where a mobile device is in the coverage area of multiple wireless networks. Such a situation can exist, for example, when a mobile phone is in the coverage area of both a cellular network and a Wi-Fi network. When such a situation arises, network traffic that would go to one network may be offloaded onto the other network in order to utilize the combined bandwidth of the two networks.

Figure 1:
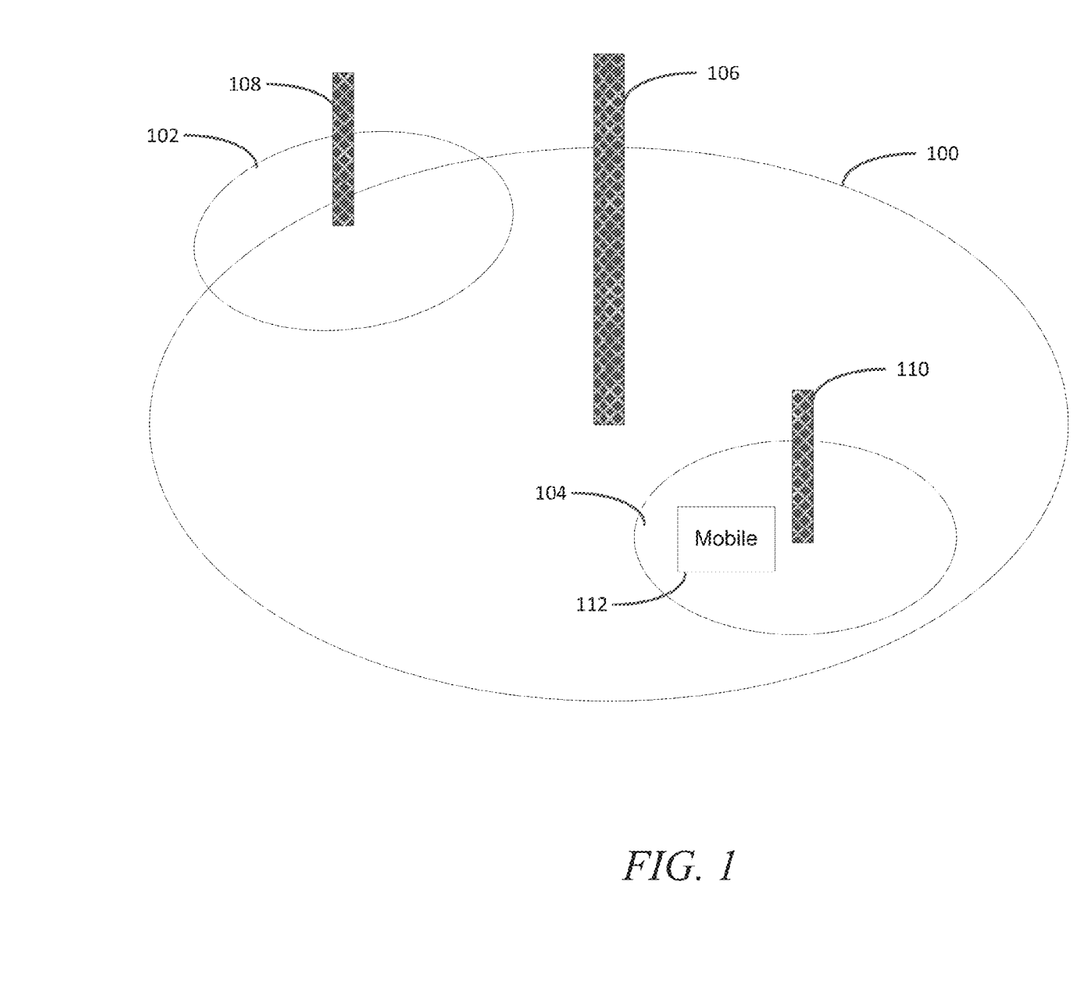
FIG. 1 illustrates various wireless networks according to some embodiments.

FIG. 1 illustrates various wireless networks according to some embodiments. FIG. 1 illustrates wireless network 100, wireless network 102 and wireless network 104. In one embodiment, the wireless network 100 comprises an evolved universal terrestrial radio access network (EU-TRAN) using the 3rd Generation Partnership Project (3GPP) long-term evolution (LTE) standard. The wireless communications network 100 includes an enhanced Node B 106 (sometimes referred to as an eNodeB, eNB or base station). eNB 106 can also be a HeNB (a home eNB). Wireless network 102 and wireless network 104 may be Wi-Fi networks using the evolving Hotspot 2.0 standard of the Wi-Fi alliance. The evolving Hotspot 2.0 standard enables seamless and non-seamless traffic offload from 3G networks (e.g., networks using the International Mobile Telecommunications-2000 (IMT-2000) specifications) and 4G (e.g. LTE) networks to Hotspot 2.0 enabled Wi-Fi networks. Wireless network 102 comprises Access Point (AP) 108 and wireless network 104 comprises Access Point (AP) 110.

As illustrated in FIG. 1, a mobile device such as mobile device 112 can reside in a location where the coverage of two networks overlap. Mobile device 112 may be any type of mobile device including, but not limited to, cellular telephones, smart phones, tablets, laptops, desktops, personal computers, servers, personal digital assistants (PDAs), web appliances, set-top box (STB), a network router, switch or bridge, printers or other devices, and the like. Such devices are sometimes referred to as User Equipment (UE) in some specifications.

A network operator wishing to offload traffic from one network to another uses policies downloaded to mobile devices to allow the mobile device to select the best network for a given situation. The policies need to take into consideration not only agreements (e.g., roaming agreements and the like) when networks are owned by different operators, but also factors such as front end bandwidth, backhaul bandwidth, total network loads, overall user experience, etc. Not all of these factors can be foreseen or computed in advance, and many can change relatively quickly based on interference, number of users in an area (e.g., based on flight arrival/departure, etc.), and so forth. It is unlikely for an operator to be able to monitor large number of APs, or other factors from a central location, and to rapidly update policies to account for changing conditions.

For mobile devices normally connected to an LTE network, policies are generally served from a central policy server implementing the 3GPP Access Network Discovery and Selection Function (ANDSF). ANDSF is a feature defined under 3GPP starting with Release 8 (see 3GPPP TS 24.302, TS 24.312 and TS 23.402) with the objective to assist devices in discovering alternative non-3GPP access networks (e.g., Wi-Fi and WiMAX) based on policies defined by network operators. However, such a central policy server cannot account for rapidly changing conditions and different deployment architectures.

Figure 2:
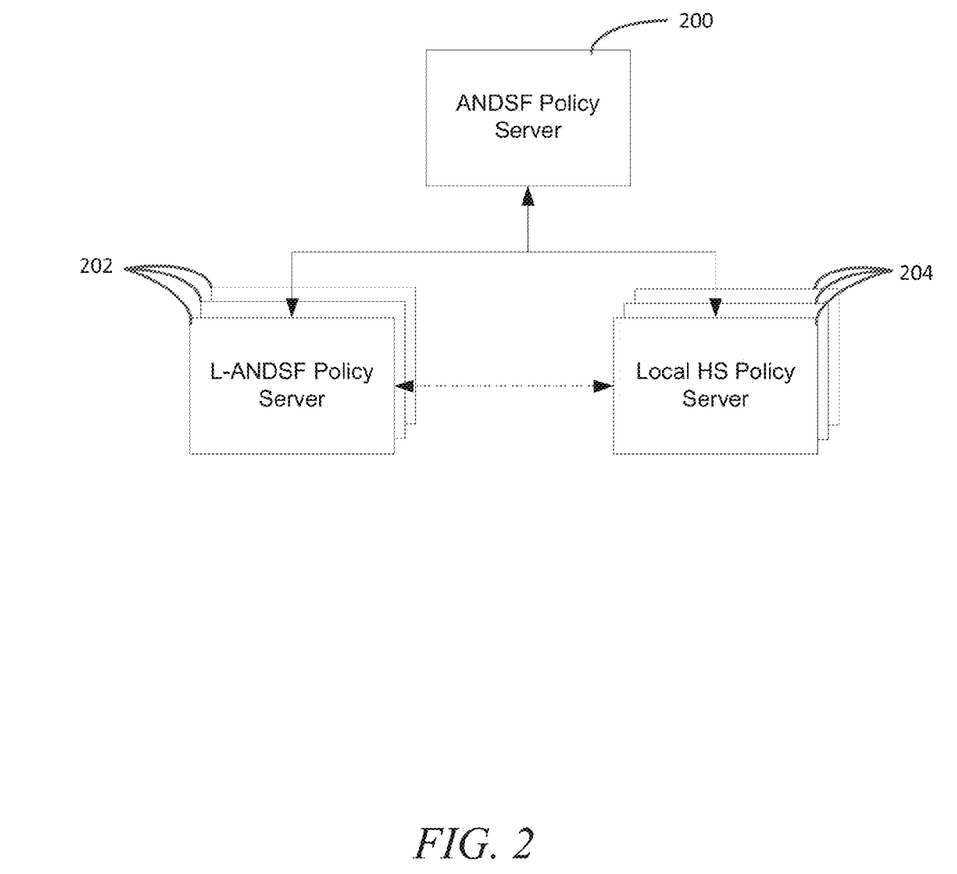
FIG. 2 illustrates a hierarchical policy architecture according to some embodiments.

FIG. 2 illustrates a hierarchical policy architecture according to some embodiments. In FIG. 2, a central policy server, such as policy server 200, works in conjunction with local policy servers, such as policy server 202 and/or policy server 204. With a hierarchy of policy servers, the local instances can work in conjunction with a central server to serve policies that account for local network conditions.

Central policy server 200 can provide policies for usage of local policy server 202 and/or local policy server 204. These policies can delegate authority to local policy servers with parameters defining the scope of delegation, how to avoid ping pong effects (i.e., switching back and forth between two networks), protocols to use to fine tune load balancing and network selections, etc. The hierarchy allows one network operator to delegate policy decisions and network selection decisions under defined circumstances to a partner in roaming scenarios.

The circumstances under which central policy server 200 authorizes local policy servers (e.g., local policy server 202 and/or local policy server 204) to take control of network selection and load balancing decisions can include, for example, mobile device location, time (e.g., time of day, day of week, etc.), offloading network(s) availability, network load, etc. Central policy server 200 can also identify how to discover and contact the local policy server (e.g., indications or advertisements in IEEE 802.11u, a mechanism of how the fully qualified domain name (FQDN) of the local policy server can be obtained, or use Domain Name System (DNS), etc.). Finally, central policy server 200 may identify how to prevent switching back and forth between networks (e.g., ping pong effects) and how to prevent conflicts between central policies from the central policy server and local policies from the local policy server(s).

Figure 3:
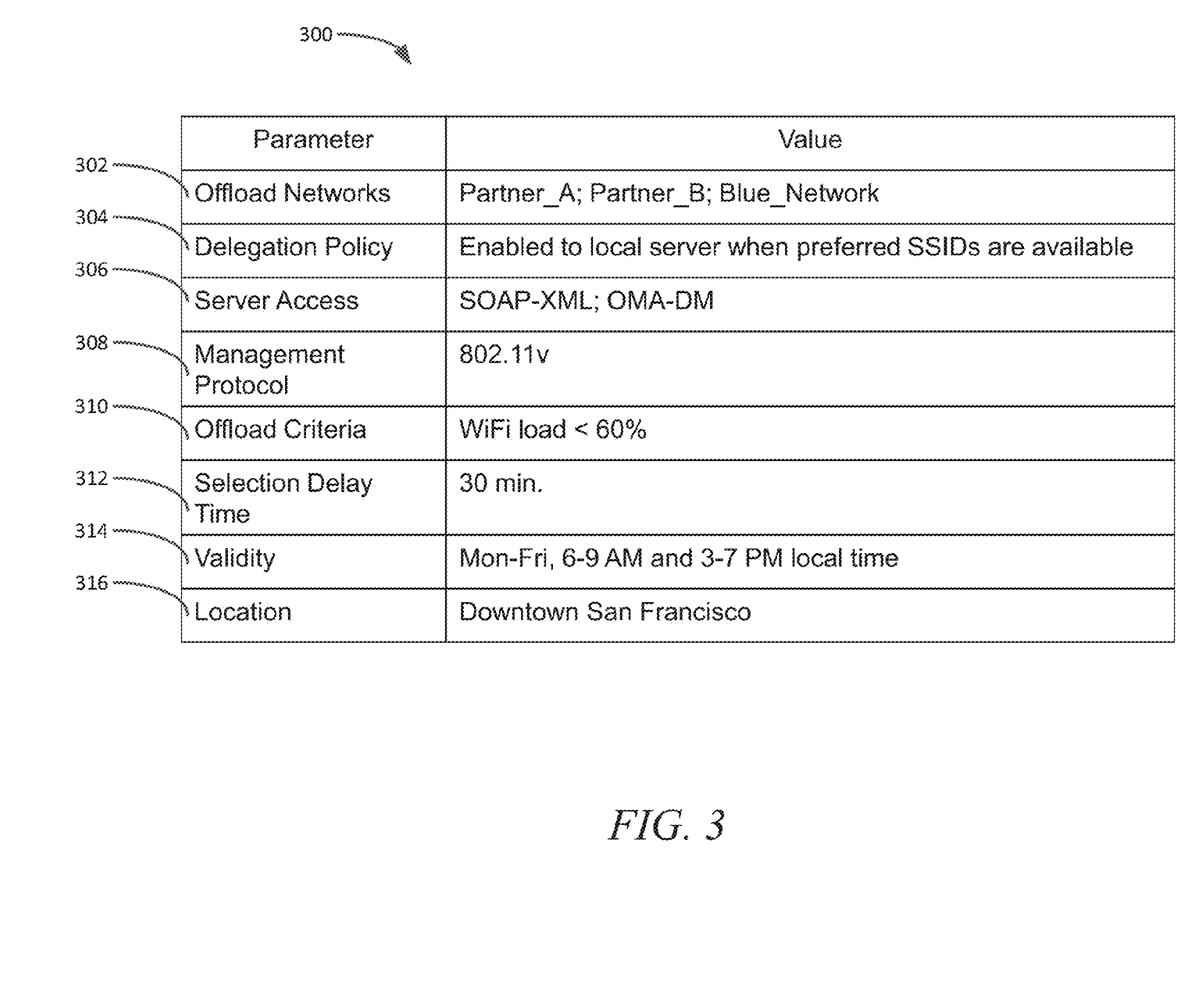
FIG. 3 illustrates an example central policy according to some embodiments.

FIG. 3 illustrates an example of a central policy management object 300 according to some embodiments. Central policy management object 300 includes one or more offload networks 302. In FIG. 3, SSIDs are used to identify Partner_A, Partner_B and Blue_Network as offload networks 302. However, any mechanism may be used to identify offload networks 302, and SSIDs are only an example.

Central policy management object 300 may include the conditions or criteria under which network selection is delegated to a local policy server (e.g., a mobile device should use policies provided by a local policy server instead of, or in addition to, policies provided in the central policy management object). In FIG. 3, this is illustrated by delegation policy parameter 304, which allows the local policy server to be used when the offload networks 302 are available.

The information in the delegation policy parameter 304 may be used in conjunction with other information to determine when the policy from a local policy server can be used. For example, parameters 314 and 316 indicate a time and location, respectively, when the policy from a local policy server can be used. In FIG. 3, these parameters 314, 316 indicate that the local policy from a local policy server can be used Monday through Friday, from 6 AM to 9 AM and then again from 3 PM to 7 PM when the mobile device is located in downtown San Francisco.

Central policy management object 300 may include parameters that allow a mobile device to locate and interact with a local policy server. In FIG. 3, these parameters include server access parameter 306 and management protocol parameter 308. These parameters 306, 308 indicate that the mobile device can use Simple Object Access Protocol (SOAP) Extensible Markup Language (XML) or Open Mobile Alliance (OMA) Device Management (DM) to access the local policy server and use IEEE 802.11v, which allows configuration of client devices while connected to wireless networks, as the management protocol. Other protocols and/or ways to identify and access local policy servers can also be included.

Central policy management object 300 may include conditions under which the mobile device should offload its traffic to one of the offload networks 302. In FIG. 3, offload criteria 310 indicates that traffic should be offloaded when the load on the Wi-Fi network is less than 60%. Other parameters can also be included, such as a parameter that calls for offloading (rather than suggesting offloading) under certain conditions, or parameters that indicate that offloading may be (or should be) performed when the load on the existing network (as opposed to the target offload network) meets certain criteria. Speed, throughput, bandwidth, or other parameters may also be used.

When a mobile device can select between networks under certain conditions allowed or called for by a policy, there can be the possibility of frequent switching between networks (e.g., ping pong effect). Mechanisms can be put in place to minimize or eliminate this switching. One such mechanism illustrated in FIG. 3 is selection delay time parameter 312, which for example purposes is shown as 30 minutes. Selection delay time parameter 312 indicates to a mobile device how long the device should wait before reevaluating its network choice. Of course, if something eliminates its network connection such as moving outside network coverage area, dropped network coverage, and so forth, the mobile device may select a new network even if the time indicated by selection delay time parameter 312 has not yet expired.

Figure 4:
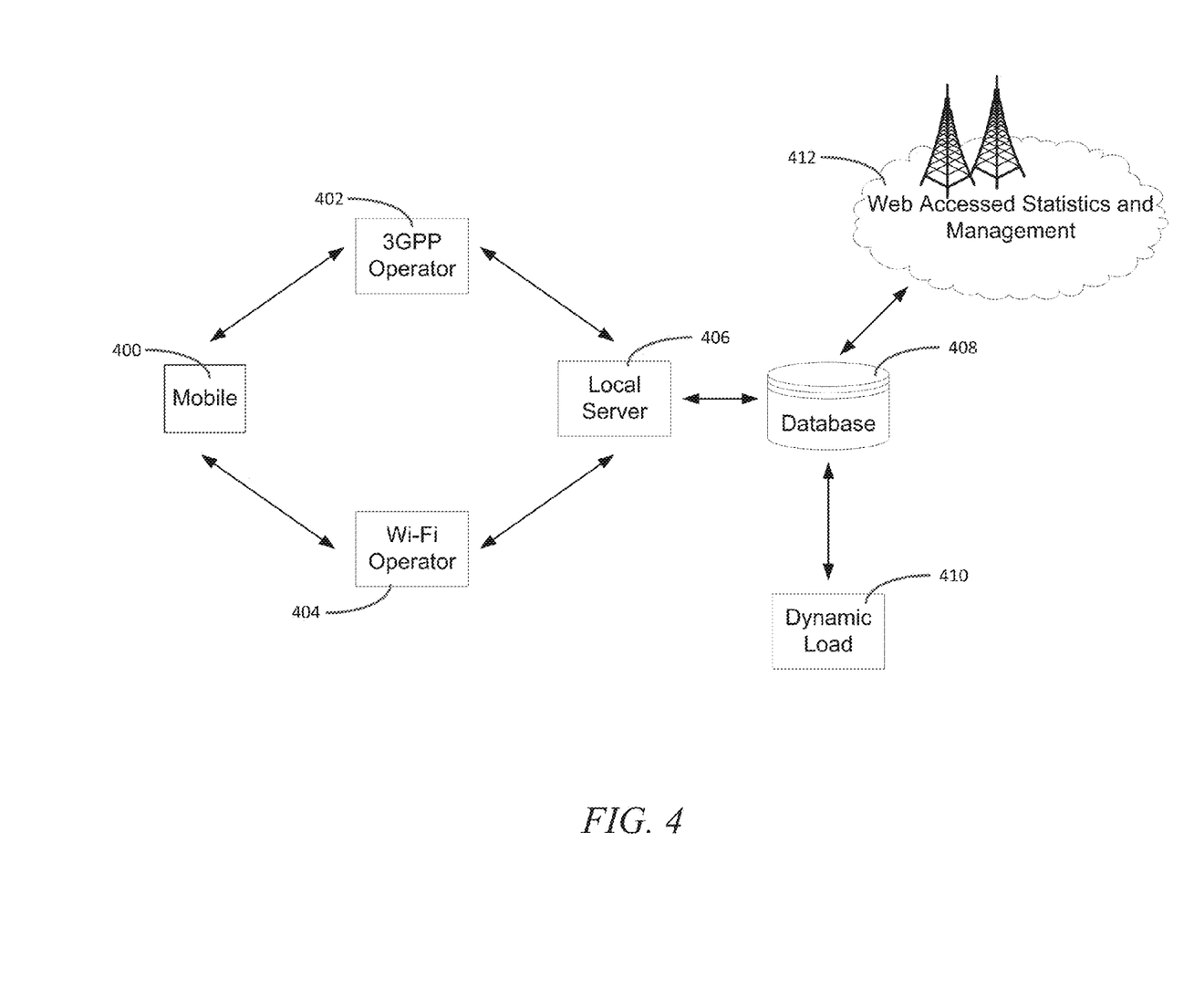
FIG. 4 illustrates a hierarchical policy architecture according to some embodiments.

FIG. 4 illustrates a hierarchical policy architecture according to some embodiments. In FIG. 4, mobile device 400 is in range of a network operated by 3GPP operator 402 and a network operated by Wi-Fi operator 404. Mobile device 400 can receive a central policy management object via 3GPP operator 402. Such a policy may come from a central policy server (not shown) or perhaps from a local policy server, either a local server implementing ANDSF (not shown) or local server 406. Local server 406 can implement ANDSF and/or the Hotspot 2.0 technical specification from the Wi-Fi alliance. The central policy management object will allow mobile device 400 to know where to locate local server 406, how to communicate with local server 406 and under what conditions to follow any policy received from local server 406.

When the conditions of any central policy management object are met, mobile device 400 can receive a local policy management object and, based on the information in the local policy management object, select and connect to a network. The local policy management object may be received, for example, from local server 406.

When selecting a network based on parameters contained in a central policy management object and/or a local policy management object, conflicts between information in local policy management objects and the central policy management object may arise. Such conflicts can be resolved in a variety of ways. In some embodiments, information in the local policy management object may be selected over information in the central policy management object. In other embodiments, conflicting information may be weighted and/or merged in a variety of ways.

Policy management objects from local server 406 may reside locally or may reside on a database, such as database 408. In some embodiments, database 408 can be a repository of information needed to create a policy management object and can include information and statistics accessed from the web (e.g., as illustrated in 412), or accessed from elsewhere.

For example, dynamic load block 410 may illustrate a data source for the dynamic load information for a network such as a 3G, 4G network and/or a Wi-Fi network. Additionally, or alternatively, Wi-Fi network information may be known by local server 406 and stored in database 408. As also illustrated in 412, database 408 may be managed remotely over the web.

Figure 5:
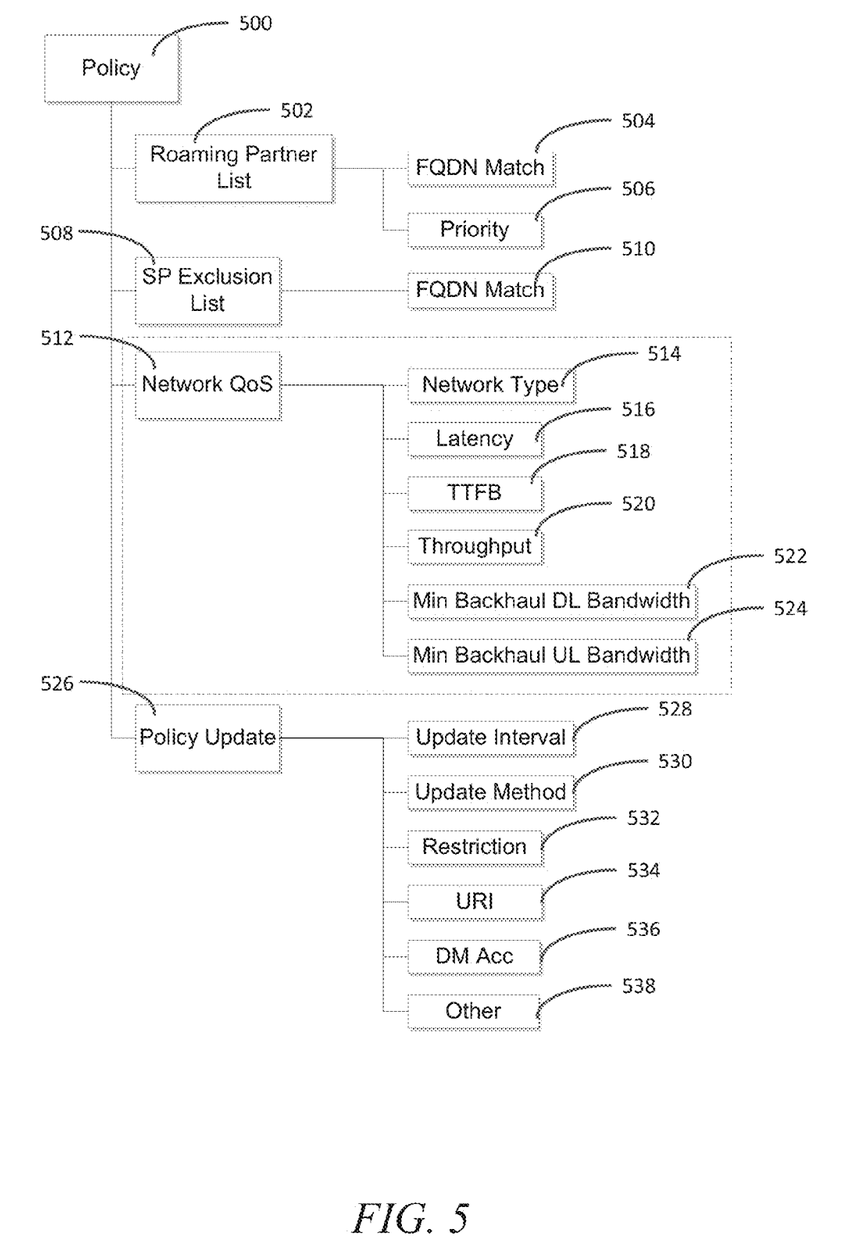
FIG. 5 illustrates a local policy according to some embodiments.

FIG. 5 illustrates a local policy 500, according to some embodiments. The illustration of FIG. 5 shows various parameters that may be included in a local policy management object. Zero, one or more than one instance of each parameter (or group of parameters) is possible for most parameters. The parameters here will often simply be referred to by their name and/or number. Furthermore, parameters are often referred to as being part of a policy. However, this should be understood as the referenced parameter may be included in an appropriate policy management object.

Policy 500 may include roaming partner list 502. List 502 identifies offload networks that a mobile device can connect to. The list 502 can include multiple identified networks. Networks may be identified in a variety of ways, such as SSID or Fully Qualified Domain Name (FQDN), and may include a priority which can indicate a preference or order of connection. In FIG. 5, networks are identified by FQDN Match 504 and have Priority 506.

Policy 500 may include service provider exclusion list 508. Such a list 508 is useful, for example, when an operator wishes to prohibit connection to a particular network or set of networks. As before, networks can be identified in a variety of ways. In FIG. 5, networks are identified by FQDN Match 510.

Policy 500 may include Quality of Service (QoS) section 512. This section 512 can provide the local, rapidly changing information that will allow a device to make a good decision and will allow a network operator to direct traffic to a particular network based on local conditions. It will also allow an operator to fine tune the overall user experience. One or more QoS sections 512 can be included.

QoS section 512 may include network type parameter 514. Parameter 514 specifies the type of network (e.g., home or roaming) for which the policy 500 applies. The policy 500 can be set for home and for roaming networks with different values for other parameters in the QoS section 512. If the mobile device has access to both home and roaming networks, the device can use a priority scheme to select between them. This priority scheme can include giving preference to home networks over roaming networks.

QoS section 512 may include latency parameter 516. Latency parameter 516 may identify a threshold for the mobile device to consider when selecting a network (or when selecting an access point to provide access to a network). If the latency of a particular access point is below the threshold, then the access point may be considered for association.

QoS section 512 may include time to first byte parameter 518. Time to first byte parameter 518 may identify a threshold for the mobile device to consider when selecting a network (or when selecting an access point to provide access to a network). If the time to first byte of a particular access point is below the threshold, then the access point may be considered for association.

QoS section 512 may include throughput parameter 520. Throughput parameter 520 may identify the maximum acceptable load (e.g., channel utilization) for the mobile device to consider when selecting a network (or when selecting an access point to provide access to a network). If the load of a particular access point is below the threshold, then the access point may be considered for association.

QoS section 512 may include minimum backhaul downlink bandwidth parameter 522. Minimum backhaul downlink bandwidth parameter 522 may identify a threshold for the mobile device to consider when selecting a network (or when selecting an access point to provide access to a network). If the backhaul downlink bandwidth of a particular access point is above the threshold, then the access point may be considered for association. The available bandwidth for parameter 522 may be calculated based on the downlink speed, the backhaul load, and the number of devices associated with the access point. Parameter 522 can also be left out or set to a value indicating that there is no minimum called for.

QoS section 512 may include minimum backhaul uplink bandwidth parameter 524. Minimum backhaul uplink bandwidth parameter 524 may identify a threshold for the mobile device to consider when selecting a network (or when selecting an access point to provide access to a network). If the backhaul uplink bandwidth of a particular access point is above the threshold, then the access point may be considered for association. The available bandwidth for parameter 524 may be calculated based on the uplink speed, the backhaul load, and the number of devices associated with the access point. Parameter 524 can also be left out or set to a value indicating that there is no minimum called for.

Policy 500 may include policy update section 526 to indicate when, under what conditions, and how the policy 500 should be updated. Update interval 528 specifies how often the policy 500 should be updated (e.g., received from the local server). Update method 530 indicates how policy 500 should be updated. Options can include client-initiated, where the mobile device initiates the policy update, and server-initiated, where the server pushes the policy 500 to the client. Restriction 532 indicates at which access points (or networks) the policy 500 may be updated. For example, updates can be restricted to home networks, roaming networks, or unrestricted. URI 534 identifies where the policy 500 should be updated (e.g., using a Uniform Resource Identifier (URI)). DM Acc 536 may be an optional parameter specifying the account on the Device Management (DM) server that should be used. Finally, Other 538 is an optional parameter that may contain vendor specific methods that the network operator can use to update the policy 500.

Figure 6:
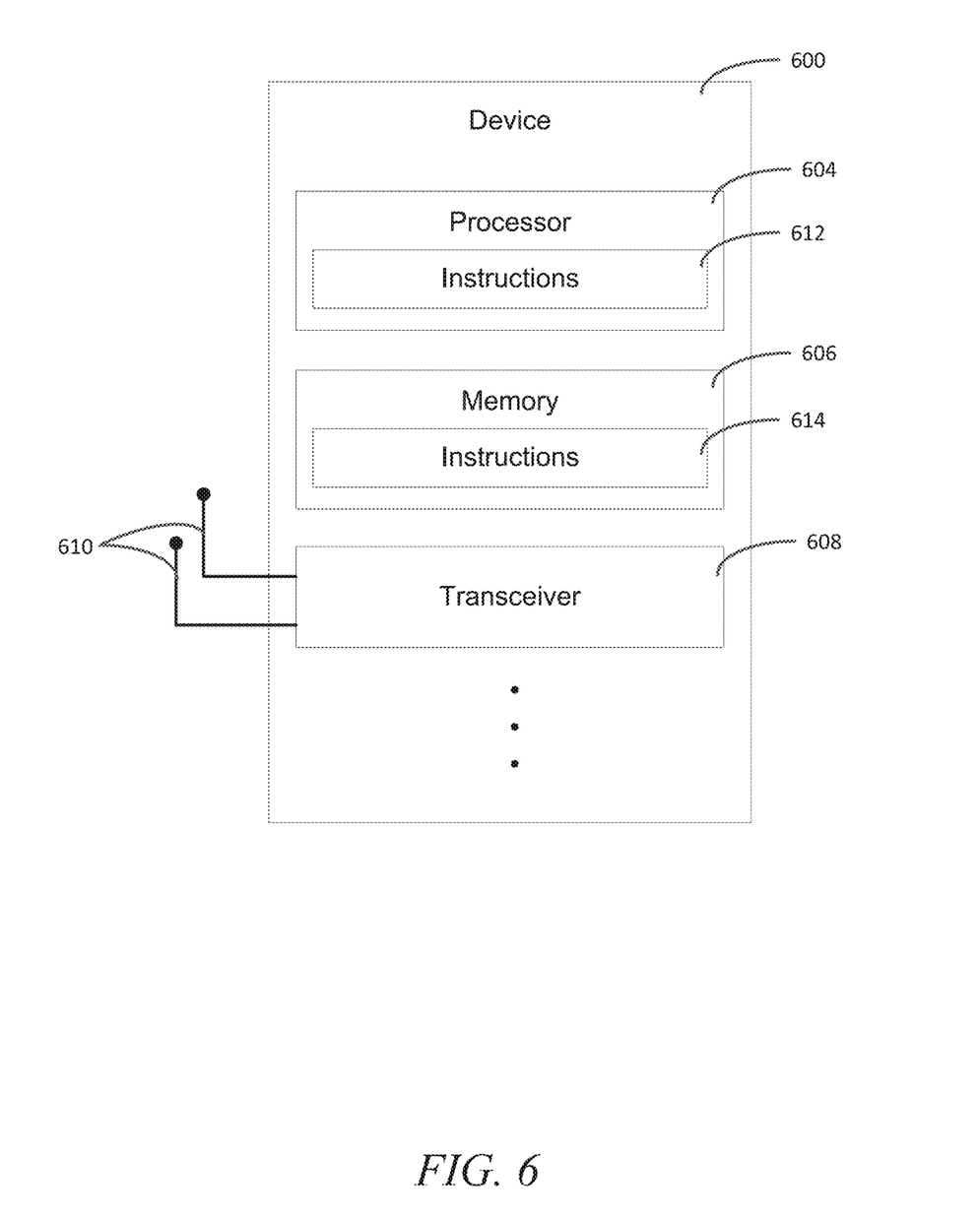
FIG. 6 illustrates a system block diagram according to some embodiments.

FIG. 6 illustrates an example system block diagram according to some embodiments. FIG. 6 illustrates a block diagram of a device 600 (such as mobile device 112 of FIG. 1 or mobile device 400 of FIG. 4). Device 600 may include processor 604, memory 606, transceiver 608 (including at least one antenna 610), instructions 612, 614, and possibly other components (not shown). While similar from a block diagram standpoint, it will be apparent to those of skill in the art that the configuration and details of operation of different devices may be similar, or substantially different, depending on the exact device and role.

The processor 604 comprises one or more central processing units (CPUs), graphics processing units (GPUs), accelerated processing units (APUs), or various combinations thereof. The processor 604 provides processing and control functionalities for device 600.

Memory 606 comprises one or more memory units configured to store instructions and data for device 600. Transceiver 608 comprises one or more transceivers including, for an appropriate station or responder, a multiple-input and multiple-output (MIMO) antenna to support MIMO communications. Transceiver 608 receives transmissions and transmits transmissions, among other things, from and to other devices in one or more networks.

The instructions 612, 614, comprise one or more sets of instructions or software executed on a computing device (or machine) to cause such computing device (or machine) to perform any of the methodologies discussed herein. The instructions 612, 614 (also referred to as computer- or machine-executable instructions) may reside, completely or at least partially, within processor 604 and/or the memory 606 during execution thereof by device 600. While instructions 612 and 614 are illustrated as separate, they can be part of the same whole. The processor 604 and memory 606 also comprise machine-readable media.

In FIG. 6, processing and control functionalities are illustrated as being provided by processor 604 along with associated instructions 612, 614. However, these are only examples of processing circuitry that comprise programmable logic or circuitry (e.g., as encompassed within a general-purpose processor or other programmable processor) that is temporarily configured by software or firmware to perform certain operations. In various embodiments, processing circuitry may comprise dedicated circuitry or logic that is permanently configured (e.g., within a special-purpose processor, application specific integrated circuit (ASIC), or array) to perform certain operations. It will be appreciated that a decision to implement a processing circuitry mechanically, in dedicated and permanently configured circuitry, or in temporarily configured circuitry (e.g., configured by software) may be driven by, for example, cost, time, energy-usage, package size, or other considerations.

Accordingly, the term "processing circuitry" should be understood to encompass a tangible entity, be that an entity that is physically constructed, permanently configured (e.g., hardwired), or temporarily configured (e.g., programmed) to operate in a certain manner or to perform certain operations described herein.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

The term "computer readable medium," "machine-readable medium" and the like should be taken to include a single medium or multiple media (e.g., a centralized or distributed database, and/or associated caches and servers) that store the one or more sets of instructions. The terms shall also be taken to include any medium that is capable of storing, encoding or carrying a set of instructions for execution by the machine and that cause the machine to perform any one or more of the methodologies of the present disclosure. The term "computer readable medium," "machine-readable medium" shall accordingly be taken to include both "computer storage medium," "machine storage medium" and the like (tangible sources including, solid-state memories, optical and magnetic media, or other tangible devices and carriers but excluding signals per se, carrier waves and other intangible sources) and "computer communication medium," "machine communication medium" and the like (intangible sources including, signals per se, carrier wave signals and the like).

It will be appreciated that, for clarity purposes, the above description describes some embodiments with reference to different functional units or processors. However, it will be apparent that any suitable distribution of functionality between different functional units, processors or domains may be used without detracting from embodiments of the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present inventive subject matter has been described in connection with some embodiments, it is not intended to be limited to the specific form set forth herein. One skilled in the art would recognize that various features of the described embodiments may be combined in accordance with the disclosure. Moreover, it will be appreciated that various modifications and alterations may be made by those skilled in the art without departing from the scope of the inventive subject matter.

What is claimed is:

1. A device including one or more processors, the one or more processors including circuitry, the circuitry having logic to:
    receive a management object that includes policy parameters;
    select a network based on the policy parameters; and
    receive a request to contact a policy server for a policy update, wherein the policy parameters include an update interval parameter to indicate how often the device is to check for policy updates from the policy server, a restriction parameter to indicate at which access points the device is permitted to update the policy and a minimum backhaul threshold downlink or uplink bandwidth, and wherein the logic is further to check for the policy update at the update interval parameter when the device has associated to a network for which the restriction parameter permits the device to check for the policy update.

2. The device of claim 1, wherein the policy parameters include a roaming partner list that includes a priority for indicating an order of preference for a roaming partner.

3. The device of claim 1, wherein the policy parameters include a service provider exclusion list.

4. The device of claim 1, wherein the policy parameters include a minimum backhaul threshold downlink bandwidth.

5. The device of claim 4, wherein the device further includes:
    two or more antennas, and
    a transceiver configured to be coupled to the two or more antennas.

6. The device of claim 5, wherein the device is to receive the management object over a web interface.

7. The device of claim 1, wherein the policy parameters include a minimum backhaul threshold uplink bandwidth.

8. A non-transitory computer-readable storage medium that stores instructions for execution by one or more processors to perform operations for operating a device in a wireless network, the operations to configure the device to:
    receive a management object that includes policy parameters;
    select a network based on the policy parameters; and
    receive a request to contact a policy server for a policy update, wherein the policy parameters include an update interval parameter to indicate how often the device is to check for policy updates from the policy server, a restriction parameter to indicate at which access points the device is permitted to update the policy and a minimum backhaul threshold downlink or uplink bandwidth, and wherein the logic is further to check for the policy update at the update interval parameter when the device has associated to a network for which the restriction parameter permits the device to check for the policy update.

9. The non-transitory computer-readable storage medium of claim 8, wherein the policy parameters include a roaming partner list that includes a priority for indicating an order of preference for a roaming partner.

10. The non-transitory computer-readable storage medium of claim 8, wherein the policy parameters include a service provider exclusion list.

11. The non-transitory computer-readable storage medium of claim 8, wherein the policy parameters include a minimum backhaul threshold downlink bandwidth.

12. The non-transitory computer-readable storage medium of claim 8, wherein the policy parameters include a minimum backhaul threshold uplink bandwidth.

13. A method performed by a device for communicating in a wireless communication network, the method comprising:
 receiving a management object that includes policy parameters, selecting a network based on the policy parameters; and
 receiving a request to contact a policy server for a policy update, wherein the policy parameters include an update interval parameter to indicate how often the device is to check for policy updates from the policy server, a restriction parameter to indicate at which access points the device is permitted to update the policy and a minimum backhaul threshold downlink or uplink bandwidth, and wherein the logic is further to check for the policy update at the update interval parameter when the device has associated to a network for which the restriction parameter permits the device to check for the policy update.

14. The method of claim 13, wherein the policy parameters include a roaming partner list that includes a priority for indicating an order of preference for a roaming partner.

15. The method of claim 13, wherein the policy parameters include a service provider exclusion list.

16. The method of claim 13, wherein the policy parameters include a minimum backhaul threshold downlink bandwidth.

17. The method of claim 13, further comprising:
 receiving the management object over a web interface.

18. The method of claim 13, wherein the policy parameters include a minimum backhaul threshold uplink bandwidth.

* * * * *